(12) United States Patent
Uchida (10) Patent No.: US 8,934,878 B2
(45) Date of Patent: Jan. 13, 2015

(54) INFORMATION DISTRIBUTION SERVICE SYSTEM USING MOBILE TERMINAL DEVICE

(75) Inventor: Kaoru Uchida, Tokyo (JP)

(73) Assignee: Lenovo Innovations Limited (Hong Kong), Quarry Bay (HK)

( * ) Notice: Subject to any disclaimer, the term of this patent is extended or adjusted under 35 U.S.C. 154(b) by 56 days.

(21) Appl. No.: 13/392,943

(22) PCT Filed: Aug. 25, 2010

(86) PCT No.: PCT/JP2010/064347
§ 371 (c)(1),
(2), (4) Date: Feb. 28, 2012

(87) PCT Pub. No.: WO2011/030668
PCT Pub. Date: Mar. 17, 2011

(65) Prior Publication Data
US 2012/0164994 A1 Jun. 28, 2012

(30) Foreign Application Priority Data

Sep. 9, 2009 (JP) .................................. 2009-207608

(51) Int. Cl.
H04M 3/42 (2006.01)
H04L 12/58 (2006.01)
(52) U.S. Cl.
CPC ...................................... *H04L 51/38* (2013.01)
USPC ...................................................... 455/414.1
(58) Field of Classification Search
USPC ...................................................... 455/414.1
See application file for complete search history.

(56) References Cited

U.S. PATENT DOCUMENTS

| 7,130,880 | B1 * | 10/2006 | Burton et al. | 709/203 |
| 7,668,830 | B2 * | 2/2010 | Hakala | 713/154 |
| 2003/0008682 | A1 * | 1/2003 | Emerson, III | 455/557 |
| 2004/0171370 | A1 * | 9/2004 | Natarajan | 455/413 |
| 2004/0192299 | A1 * | 9/2004 | Wilson et al. | 455/433 |
| 2004/0198224 | A1 * | 10/2004 | Kazakevich | 455/41.1 |
| 2004/0209614 | A1 * | 10/2004 | Bright et al. | 455/426.1 |
| 2005/0220060 | A1 * | 10/2005 | Takusagawa et al. | 370/338 |

(Continued)

FOREIGN PATENT DOCUMENTS

| JP | 2002-300655 | 10/2002 |
| JP | 2003-009243 | 1/2003 |

(Continued)

OTHER PUBLICATIONS

International Search Report, PCT/JP2010/064347, Oct. 12, 2010.
United States Official Action—U.S. Appl. No. 14/458,889—Sep. 18, 2014.

*Primary Examiner* — Nathan Mitchell
(74) *Attorney, Agent, or Firm* — Young & Thompson (57) ABSTRACT

An information distribution service system includes a mobile terminal device with a communication part and another terminal device connected to the mobile terminal device via the communication part. The mobile terminal device includes a server function part that provides information to another terminal device; an email control part that sends information, regarding an access method for accessing the information with another terminal device, to another terminal device via an email; and a server access control part that operates the server function part so as to start processing for providing the information when another terminal device makes an access according to the access method.

14 Claims, 6 Drawing Sheets

(56) References Cited

U.S. PATENT DOCUMENTS

| | | |
|---|---|---|
| 2005/0256870 A1* | 11/2005 | Benco et al. ............... 707/9 |
| 2005/0288045 A1* | 12/2005 | Yang et al. ............... 455/466 |
| 2006/0211409 A1 | 9/2006 | Davis |
| 2007/0049258 A1* | 3/2007 | Thibeault ............... 455/414.1 |
| 2008/0009272 A1* | 1/2008 | Toledano ............... 455/414.1 |
| 2008/0034092 A1 | 2/2008 | Kikuchi et al. |
| 2008/0102892 A1 | 5/2008 | Louks et al. |
| 2009/0011748 A1* | 1/2009 | Hotta ............... 455/414.3 |
| 2011/0154014 A1 | 6/2011 | Thorn |
| 2012/0077436 A1 | 3/2012 | Konded et al. |
| 2012/0252512 A1 | 10/2012 | Carlton et al. |
| 2012/0289195 A1* | 11/2012 | Yu ............... 455/411 |
| 2013/0115929 A1 | 5/2013 | Morifuku |
| 2013/0217330 A1* | 8/2013 | Gardenfors et al. ......... 455/41.2 |
| 2013/0225087 A1* | 8/2013 | Uhm ............... 455/41.3 |

FOREIGN PATENT DOCUMENTS

| | | |
|---|---|---|
| JP | 2004-040427 | 2/2004 |
| JP | 2004-102525 | 4/2004 |
| JP | 2005-258532 | 9/2005 |
| JP | 2006-195716 | 7/2006 |
| JP | 2007-058260 | 3/2007 |
| JP | 2008-015786 | 1/2008 |

* cited by examiner

| COMPANION | COUNTERPART ADDRESS | KEYWORD | FOLDER NAME | SERVICE NAME |
|---|---|---|---|---|
| B-SAN | Bbbb@xx.yy.jp | myWeb-LDN | folder321 | |
| B-SAN | Bbbb@xx.yy.jp | myGPS-on | | GPSservice |
| | | | | |

INFORMATION DISTRIBUTION SERVICE SYSTEM USING MOBILE TERMINAL DEVICE

TECHNICAL FIELD

The present invention relates to an information distribution service system and a mobile terminal device, as well as an information distribution service method and a program used for them. In particular, the present invention relates to an information distribution service method which allows a personal information device with a communication means, such as a mobile phone, to disclose execution results of functions installed in a mobile terminal device, such as internally accumulated data and a sensing function.

BACKGROUND ART

It is necessary to meet customer needs, in the foregoing personal information device with a communication means such as a mobile phone, for disclosing a part of execution results of functions installed in a mobile terminal device such as internally accumulated data and a sensing function.

For instance, it is necessary to meet customer needs in which the user of a mobile phone terminal determines his/her current position with a GPS (Global Positioning System) so as to allow his/her family members to detect geodetic information with their devices or in which the user shoots images using a built-in camera so as to allow his/her friends to browse photos accumulated in his/her terminal with their devices.

To implement service operation satisfying these needs, it is necessary to install a server function in a mobile phone terminal, which is thus used to transmit GPS geodetic information or accumulated photo data via server function processing upon receiving a request according to a certain protocol from an external device.

This usage may be implemented via generally-known Web technology, for example, which allows a Web server installed in a terminal to make a predetermined reply upon receiving an HTTP (Hyper Text Transfer Protocol) request, including a URL (Uniform Resource Locator) and a port number, from an external device.

Generally speaking, the foregoing server function has been installed in a server device configured of a large-scale computer, which performs authentication to confirm whether or not an authorized user is currently accessing using a client terminal, such as a mobile phone, via a network (e.g. PLT1 to PLT).

CITATION LIST

Patent Literature

PLT 1: Japanese Patent Application Publication No. 2002-300655
PLT 2: Japanese Patent Application Publication No. 2003-009243
PLT 3: Japanese Patent Application Publication No. 2004-102525
PLT 4: Japanese Patent Application Publication No. 2006-195716

SUMMARY OF INVENTION

Technical Problem

A generally-used Internet Web server may normally perform server operation to meet a client's request. However, when a mobile phone normally performs server operation as described above, it suffers from a problem in that the server operation involves power consumption to cause early exhaustion of battery power. There is another problem in that the user of a mobile phone is likely to undergo DoS (Denial of Service) due to an unauthorized request by a holder in bad faith, i.e. a sabotage that repeatedly makes a request to the server to incapacitate services.

Additionally, it is inconvenient for an external user B to manually input a URL or a port number accessing a mobile phone terminal P of a user A.

Moreover, none of PLT1 to PLT4 discloses installation of a server function in a mobile phone terminal; hence, these documents do not at all demonstrate recognition on the aforementioned problems.

It is an object of the present invention to provide an information distribution service system and a mobile terminal device, as well as an information distribution service method and a program used for them, all of which are designed to relieve a negative influence on the functionality of a mobile terminal device due to DoS without causing early exhaustion of battery power.

Solution to Problem

An information distribution service system of the present invention includes a mobile terminal device with a communication part and another terminal device connected to the mobile terminal device via the communication part. The mobile terminal device includes a server function part that provides information to another terminal device; an email control part that sends information, regarding an access method for accessing the information with another terminal device, to another terminal device via an email; and a server access control part that operates the server function part so as to start processing for providing the information when another terminal device makes an access according to the access method.

A mobile terminal device of the present invention is connected to another terminal device, which is preregistered, via a communication part. The mobile terminal device includes a server function part that provides information to another terminal device; an email control part that sends information, regarding an access method for accessing the information with another terminal device, to another terminal device via an email; and a server access control part that operates the server function part so as to start processing for providing the information when another terminal device makes an access according to the access method.

An information distribution service method of the present invention is used for a system including a mobile terminal device with a communication part and another terminal device connected to the mobile terminal device via the communication part. The information distribution service method provides the mobile terminal device with a server function part that provides information to another terminal device and implements steps of: sending information, regarding an access method for accessing the information with another terminal device, to another terminal device via an email; and operating the server function part so as to start processing for providing the information when another terminal device makes an access according to the access method.

A program of the present invention causes a computer of a mobile terminal device, which is connected to another terminal device, which is preregistered, via a communication part. The program includes the steps of: causing the mobile terminal device to execute a server function that provides information to another terminal device; sending information, regarding an access method for accessing the information with another terminal device, to another terminal device via an email; and executing the server function so as to start processing for providing the information when another terminal device makes an access according to the access method.

Advantageous Effects of Invention

Owing to the aforementioned constitution and operation, the present invention demonstrates an effect to relieve exhaustion of battery power with a reduction of power consumption and to alleviate a negative influence on a mobile phone terminal due to DoS by a holder in bad faith.

DESCRIPTION OF EMBODIMENTS

Next, embodiments of the present invention will be described with reference to the drawings.

First, the outline of an information distribution service method according to an embodiment of the present invention will be described. In an information distribution service according to one embodiment of the present invention, a mobile phone terminal P implements a Web server function so as to perform information distribution processing, i.e. processing which allows a client terminal Q, held by a preregistered friend or the like, to access and browse data such as photos recorded in the mobile phone terminal P. In another embodiment of the present invention, the preregistered client terminal Q is allowed to request the mobile phone terminal P to perform information distribution processing, i.e. processing that performs positional sensing with a GPS and notifies the terminal Q of the detected positional information.

According to the information distribution service method of the present invention, the mobile phone terminal P sends information regarding an access method for use in data accessing to the terminal Q via an email. When the terminal Q accesses the mobile phone terminal P by way of this access method, the mobile phone terminal P executes its Web server function to start browsing or sensing functions.

According to the information distribution service of the present invention, the mobile phone terminal P transmits information regarding an access method, such as a URL (Uniform Resource Locator), a port number, and an authentication method, to the client terminal Q via an email (a prompt mail). When the terminal Q makes an access using this information regarding an access method, the mobile phone terminal P operates its Web server to enable information distribution.

As described above, this information distribution service allows the mobile phone terminal P to execute its server function on condition that the terminal Q replies to a prompt mail which is sent to the registered terminal Q. Therefore, compared to the situation in which the mobile phone terminal P is normally executing its server function, it is possible to reduce power consumption and to suppress exhaustion of battery power.

Additionally, this information distribution service utilizes different port numbers depending on disclosed data. Thus, it is possible to alleviate a negative influence to terminal functionality due to DoS by a holder of bad faith.

Moreover, this information distribution service does not require the terminal Q to manually input a URL or a port number for accessing the mobile phone terminal P; hence, it has an advantage in terms of accessibility.

Figure 1:
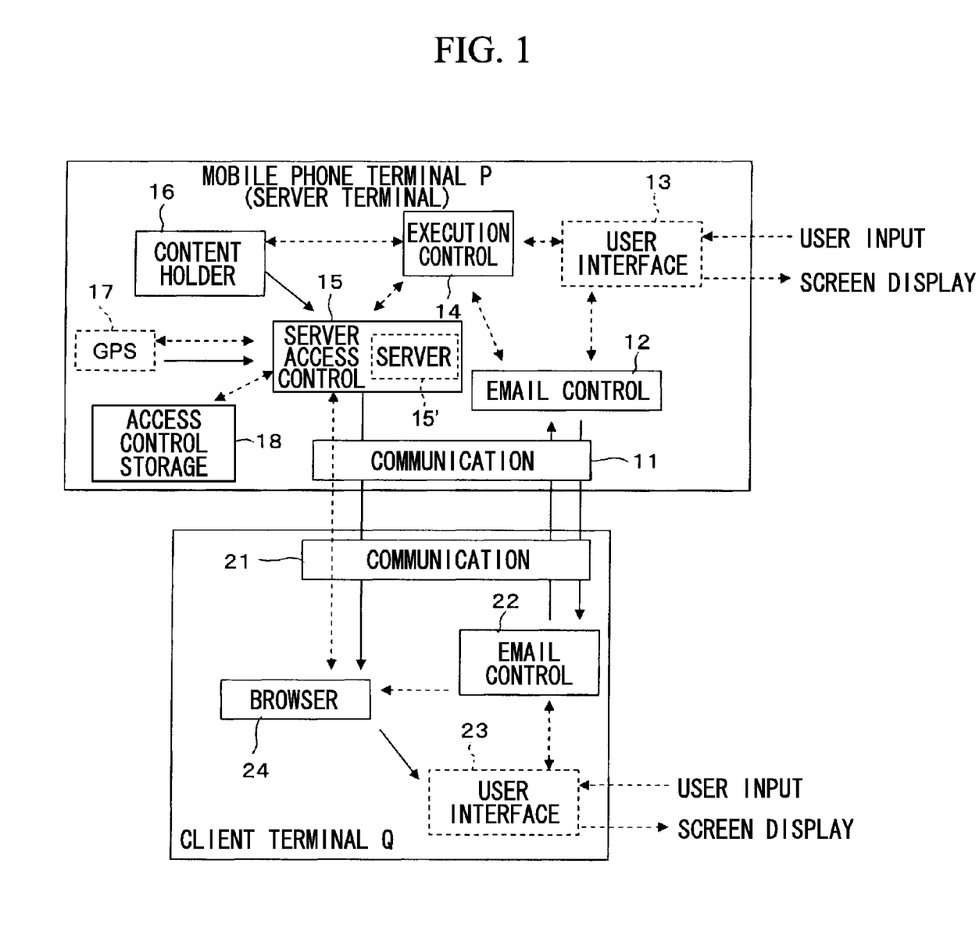
FIG. 1 A block diagram showing an information distribution service system according to an embodiment of the present invention.

FIG. 1 is a block diagram showing the constitution of an information distribution service system according to an embodiment of the present invention.

In FIG. 1, the information distribution service system of this embodiment includes the mobile phone terminal P (server terminal) and the client terminal Q receiving disclosed information. The mobile phone terminal P and the client terminal Q communicate with each other via a public network, an established connection using WiFi (Wireless-Fidelity) LAN (Local Area Network), or the like. In FIG. 1, solid lines basically indicate data flows while dashed lines indicate control flows.

The user A holds and manages the mobile phone terminal P so as to execute an application program that performs a geodetic function and performs a server operation to accumulate content including shot images and to distribute information, which will be discussed later.

The mobile phone terminal P includes a communication part 11, an email control part 12, a user interface 13, an execution control part 14, a server access control part 15, a content holder part 16, a GPS (Global Positioning System) function part 17, and an access control storage 18. A server function part 15' of the mobile phone terminal P is installed in the server access control part 15.

The user B, who receives disclosed information, holds and manages the client terminal Q so as to receive information provided by the user A. The terminal Q includes a communication part 21, an email control part 22, a user interface 23, and a browser function part 24.

In the mobile phone terminal P, the user interface 13 receives data and instructions from the user via a key input part and outputs information, intended for the user, to a display such as a screen. Upon receiving a user's instruction which is input via the user interface 13, the execution control part 14 executes various functions, installed in the terminal P, and controls execution of an application. The communication part 11 encrypts data so as to perform communication, regarding emails and Web access, with the client terminal Q or the like. The email control part 12 edits, transmits, and receives emails.

The content holder part 16 holds photos, which are shot by an unillustrated built-in camera. The GPS function part 17 measures the current potion with a GPS. The server access control part 15 executes a Web server function. The access control storage 18 holds and manages a management table for server accessing from an external device.

Figure 2:
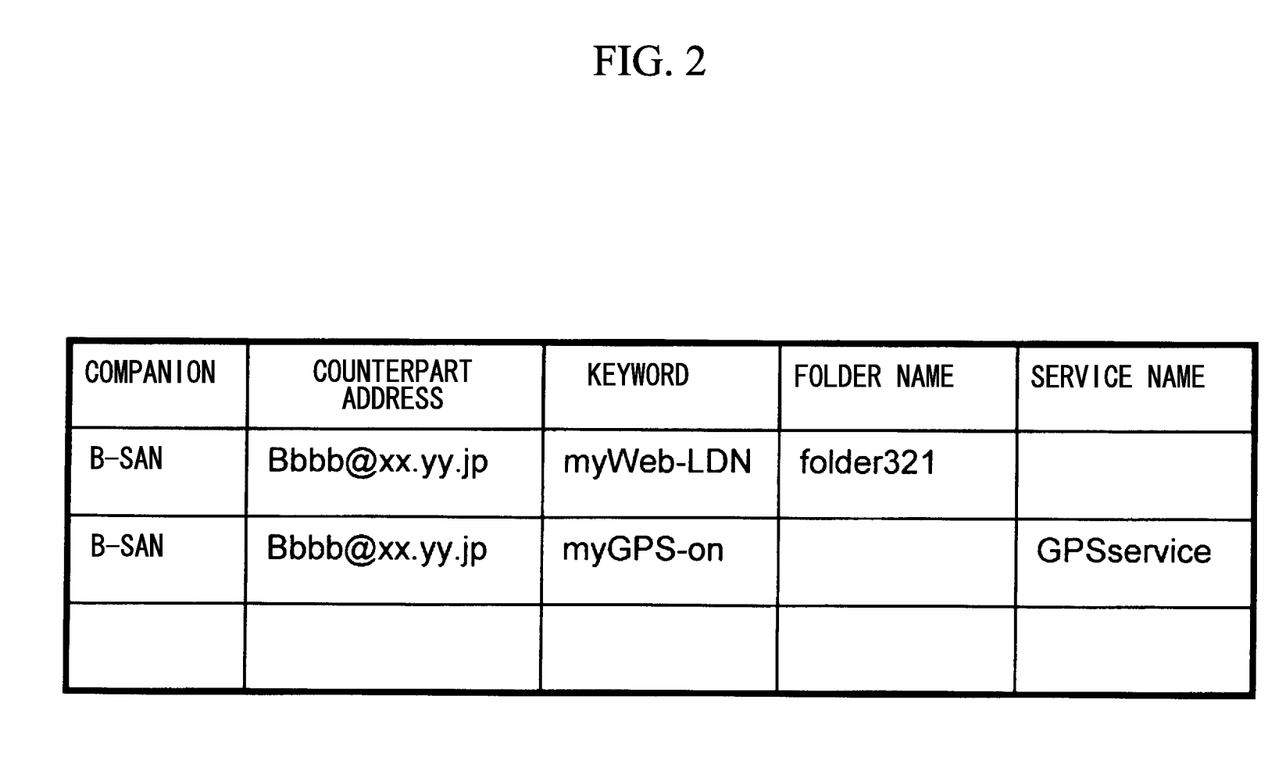
FIG. 2 A figure showing the format of a management table of access management storage in the information distribution service system shown in FIG. 1
FIG. 3 A sequence chart showing an example of operation of the information distribution service system according to a first embodiment of the present invention.

FIG. 2 is a figure showing the format of a management table of the access control storage 18 of FIG. 1. In FIG. 2, the management table is configured of COMPANION ("B-SAN"), COUNTERPART ADDRESS (Bbbb@xx.yy.jp), KEYWORD ("myWeb-LDN", "myGPS-on"), FOLDER NAME ("folder321"), and SERVICE NAME (the name of an executed function) ("GPSservice").

Figure 3:
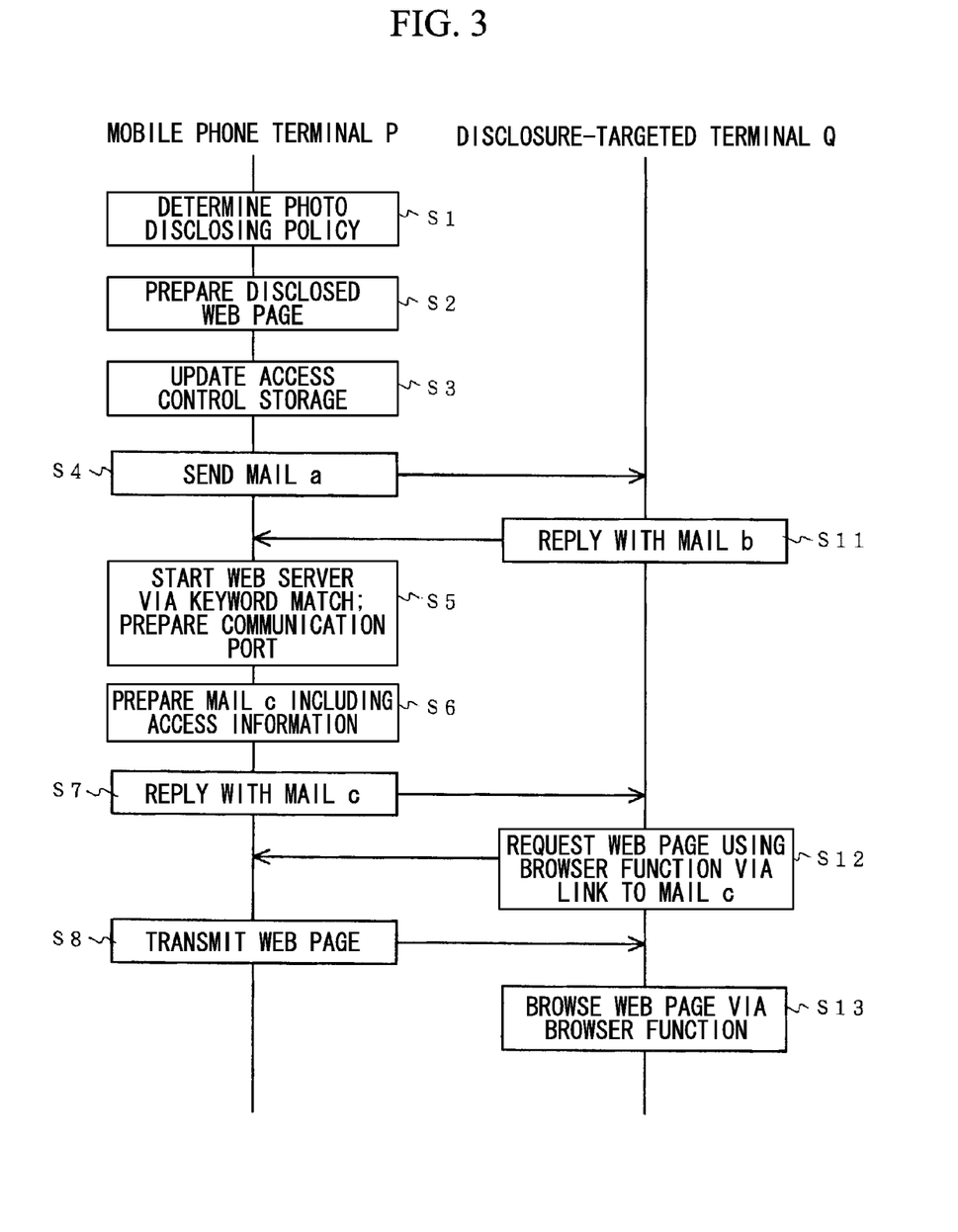
Figure 4:
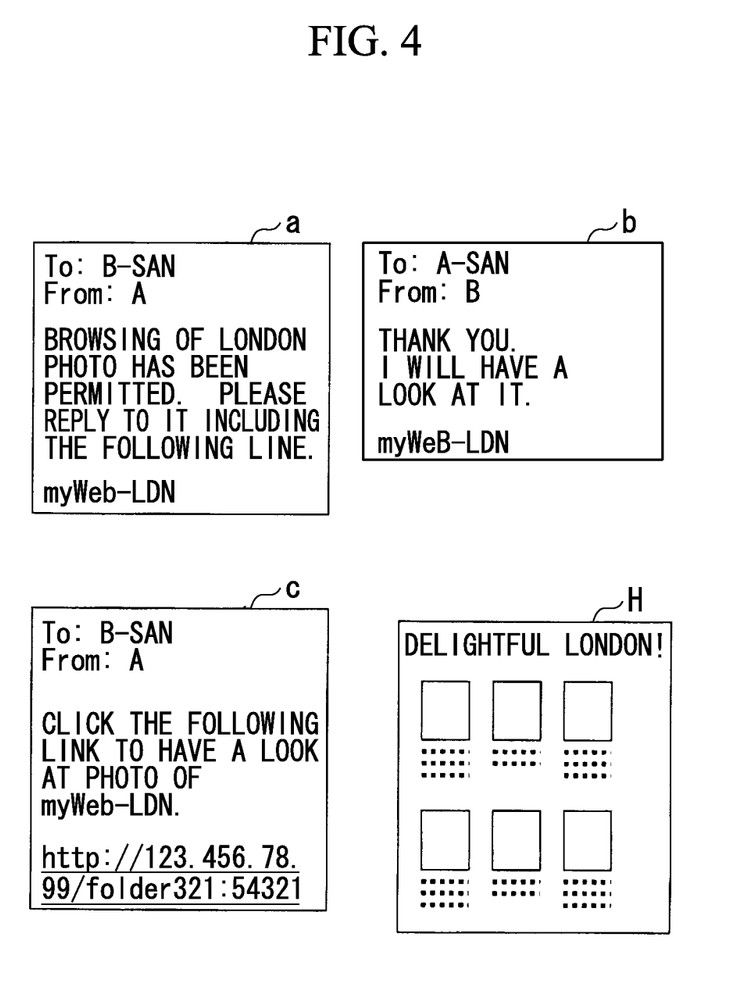
FIG. 4 An illustration of emails used in the first embodiment of the present invention.

FIG. 3 is a sequence chart showing an example of operation of an information distribution service system according to a first embodiment of the present invention, and FIG. 4 is an illustration showing an example of operation of the information distribution service system according to the first embodiment of the present invention. An operation in which the user A discloses photo data accumulated in his/her own mobile phone terminal P in response to a browse request from the user B of himself/herself will be described with reference to FIGS. 1 to 4. In this connection, the processing of the mobile phone terminal P shown in FIG. 3 is implemented using a computer (a CPU—Central Processing Unit) which is installed in the mobile phone terminal P so as to execute a program.

With reference to FIG. 3, the user A determines a policy as to which data is selected as a disclosed target and whom (the user B in this case) data is disclosed to (step S1). Next, the user A collectively stores disclosed photos in a folder (folder321) and prepares a file (index.html etc.) describing Web content of the folder in accordance with HTML (Hyper Text Markup Language) (step S2).

Next, the mobile phone terminal P stores a disclosure policy of this folder in the management table of the access control storage 18 (FIG. 2) and updates the table (step S3). Specifically, the access control storage 18 stores a mail address of the mobile terminal Q of the user B, a keyword specifying a disclosed target from the user B, and the name of a folder storing disclosed photo data in the mobile phone terminal P. In this connection, the mail address is used for authentication of the user B. Therefore, it is possible to use a more strict authentication tool considering a possibility of spoofing using a false address by an outsider.

To guide browsing by the user B, the mobile phone terminal P operates the email control part 12 to send a mail a (FIG. 4) to the user B (step S4). When the user B prefers to browse the foregoing disclosed folder, the user B sends back a mail b (FIG. 4), including the keyword "myWeb-LDN" described in the mail a (FIG. 4), to the user A (step S11).

When the email control part 12 of the mobile phone terminal P detects this keyword included in the mail b and confirms that a sender address of this mail b matches with the user B (i.e. an address "Bbbb@xx.yy.jp"), it notifies this matter to the server access control part 15. The server access control part 15 determines an appropriate port number with reference to the management table of the access control storage 18, thus starting a server function. Moreover, the server access control part 15 prepares a communication port so as to set a mode for handling an access from an external device (step S5).

Upon completion of preparing a server function, the mobile phone terminal P operates the email control part 12 to send a mail c (FIG. 4) to the user B (steps S6 and S7). The mail c includes a URL used for an access from an external device. The mail c notifies a permission to browse the content of a folder by accessing a folder of "folder321" provided in a device, which is specified using an IP (Internet Protocol) address of "123.456.78.99", via a port "54321".

Upon receiving this mail c, the user B clicks this URL (or pastes this line on an address portion of a browser) (step S12) so as to access the mobile phone terminal P. The mobile phone terminal P performs information distribution processing, i.e. processing that allows the user B to browse a disclosed server via a server function. Thus, the user B is allowed to display a Web page, prepared by the user A, on the browser function part 24 of the client terminal Q (H in FIG. 4), thus browsing the Web page (steps S8 and S13).

Thus, only the user B is allowed to browse the disclosed folder. The user A is able to determine a valid period of browsing such as "one hour sharp". Upon expiration of the valid period, the user B may be allowed to browse it again by resending the mail b. In this case, the mobile phone terminal P is able to prevent an outsider's DoS by preparing another port which differs from the foregoing communication port.

The foregoing example performs authentication on a disclosure-targeted person by simply confirming a sender address of a mail. It is possible to perform authentication using a password, which is mutually agreed in advance, thus improving security.

As described above, the present embodiment starts the server function of the mobile phone terminal P on condition that a reply is made with respect to a prompt mail (mail a) which is sent to a registered disclosure-targeted person. Thus, compared with the foregoing technology for normally executing a server function, it is possible to reduce power consumption and thereby suppress exhaustion of battery power.

Additionally, the present embodiment applies a different port number every time permission is made to disclose a Web page. Thus, it is possible to prevent DoS from a holder in bad faith, thus alleviating a negative influence on the mobile phone terminal P.

Moreover, the present embodiment does not require the user to manually input a URL and a port number for accessing the mobile phone terminal P of the user A; hence, it demonstrates accessibility with a simple operation.

Figure 5:
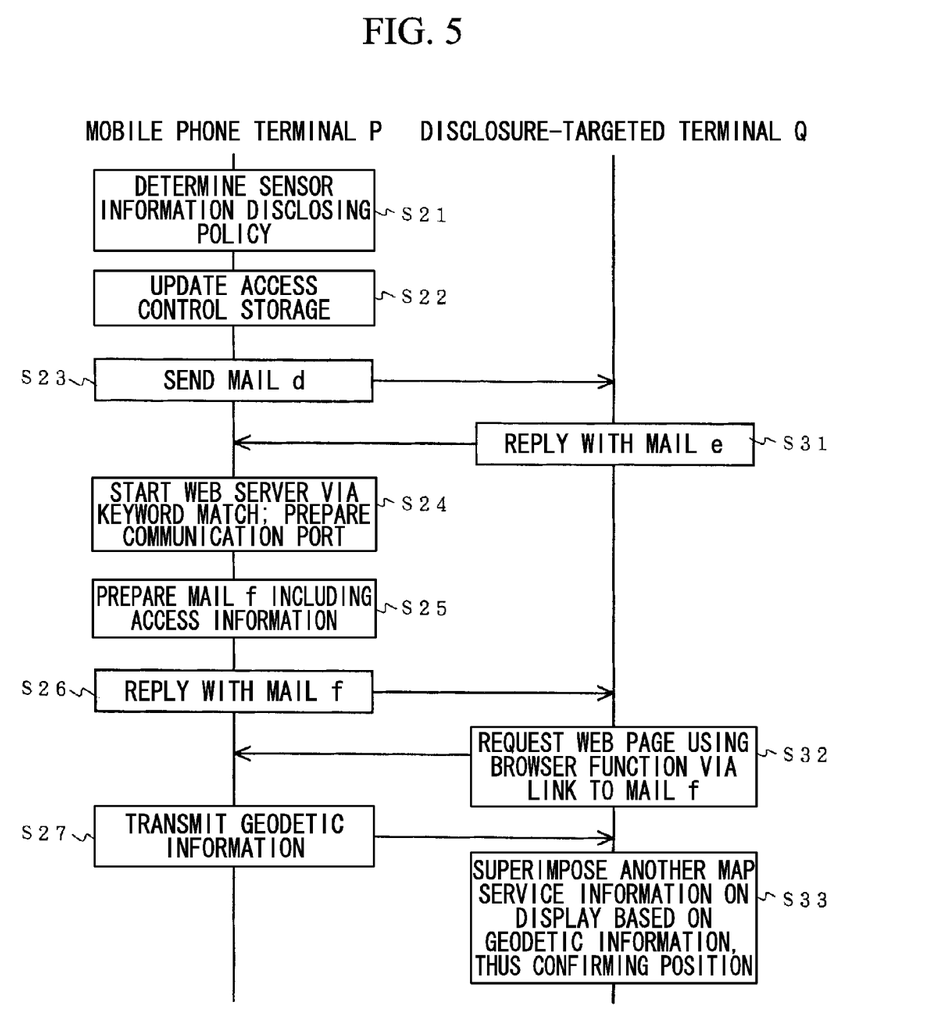
FIG. 5 A sequence chart showing an example of operation of the information distribution service system according to a second embodiment of the present invention.
Figure 6:
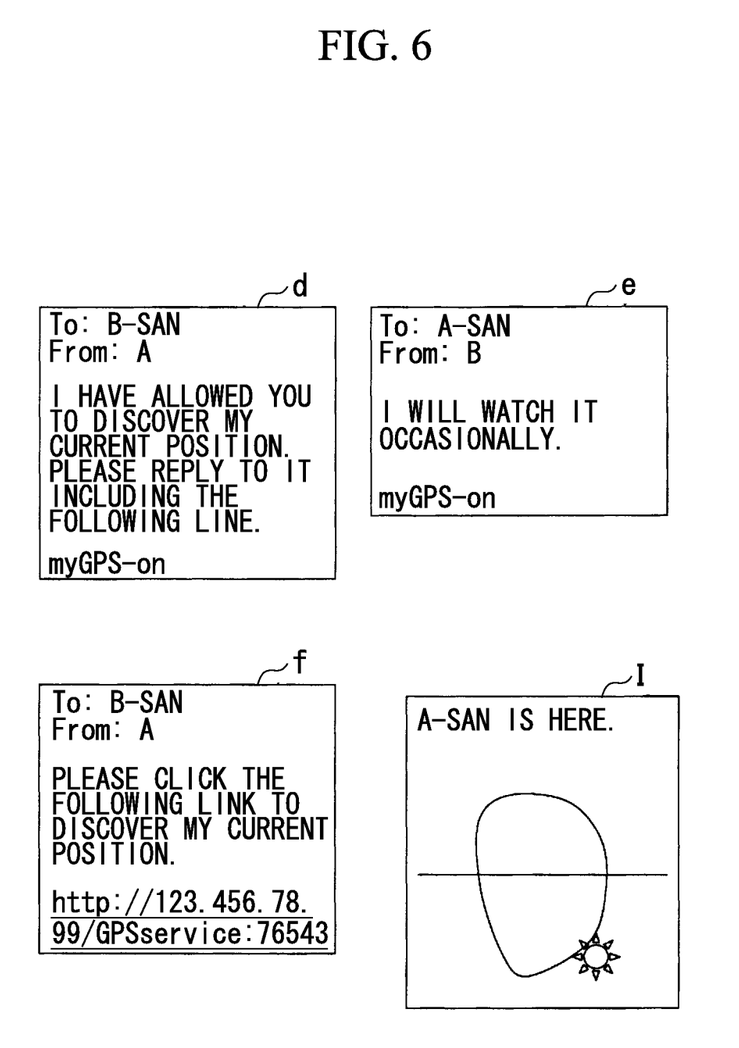
FIG. 6 An illustration of emails used in the second embodiment of the present invention.

FIG. 5 is a sequence chart showing an example of operation of an information distribution service system according to a second embodiment of the present invention, and FIG. 6 is an illustration showing an example of operation of the information distribution service system according to the second embodiment of the present invention. In this connection, the constitution of the information distribution service system according to the second embodiment of the present invention is identical to the constitution of the information distribution service system shown in FIG. 1, and the configuration of the management table is identical to that shown in FIG. 2.

An operation in which the user A uses a built-in sensor of the GPS function part 17, in his/her own mobile phone terminal P, to notify its sensing result in response to a notification request of positional information from the client terminal Q of the user B who is a family member of himself/herself will be described with reference to FIGS. 1, 2, 5, and 6. The processing of the mobile phone terminal P shown in FIG. 5 is implemented using a computer (CPU) of the mobile phone terminal P executing a program.

With reference to FIG. 5, the user A firstly determines a policy as to which function (e.g. GPS) among functions installed in the mobile phone terminal P is used to produce data subjected to disclosure and whom (the user B in this case) the data is disclosed to (step S21). Next, the user A stores this disclosure policy in the management table of the access control storage 18 (FIG. 2) and updates the table (step S22). Herein, it includes a mail address of the mobile phone terminal Q of the user B, a keyword which the user B to specify disclosed data, and a function (service name) which is executed according to a request of the user B.

To guide a request by the user B, the mobile phone terminal P operates the email control part 12 to send a mail d (FIG. 6) to the user B (step S23). To request positional information of the mobile phone terminal P by starting the GPS function of the mobile phone terminal P, the user B sends back a mail e (FIG. 6), including a keyword "myGPS-on" described in the mail d, to the user A (step S31).

When the email control part 12 of the mobile phone terminal P detects this keyword included in the mail e and confirms that a sender address of this mail e matches with the user B (i.e. an address "Bbbb@xx.yy.jp"), it notifies this matter to the server access control part 15. The server access control part 15 determines an appropriate port number with reference to the management table of the access control storage 18, thus starting the server function. Additionally, the server access control part 15 prepares a communication port so as to set a mode for handling an access from an external device (step S24).

Upon completion of preparation of the server function, the mobile phone terminal P operates the email control part 12 to send a mail f (FIG. 6) to the user B (steps S25 and S26). The mail f includes a URL used for an access from an external device. The mail f notifies that a function (service) installed in the mobile phone terminal P can be executed by accessing a service (sensing function) of "GPSservice" provided in a device, which is specified using an IP address of "123.456.78.99", via a port "76543".

Upon receiving the mail f, the user B clicks this URL (step S32) so as to access the mobile phone terminal P. The mobile phone terminal P performs information disclosure processing, i.e. processing that executes a positional sensing function with a GPS so as to detect positional information of the mobile phone terminal P (user A). Thus, it is possible to detect the positional information of the user A and provide it to the user B (step S27). For instance, the client terminal Q superimposes the position of the user A, based on positional information, on a map which is retrieved via another map service, thus displaying it on the browser function part 24 (see I in FIG. 6). Thus, the user B is able to recognize the position of the user A (step S33).

As described above, the present embodiment starts the GPS function of the mobile phone terminal P on condition that a reply is made with respect to a prompt mail (mail d) which is sent to the user B. Thus, compared with the foregoing technology for normally executing the GPS function, it is possible to reduce power consumption and thereby suppress exhaustion of battery power.

Additionally, the present embodiment applies a different port number every time permission is made to start the GPS function. Thus, it is possible to prevent DoS by a holder in bad faith and to alleviate a negative influence on the mobile phone terminal P.

The present application claims priority based on Japanese Patent Application No. 2009-207608 filed Sep. 9, 2009, the entire content of which is incorporated herein by reference.

INDUSTRIAL APPLICABILITY

The present invention is generally applicable to portable information communication devices including mobile phones. That is, the present invention is applicable to notebook-type personal computers with communication functions other than mobile phones.

REFERENCE SIGNS LIST

P mobile phone terminal
Q client terminal
11, 21 communication part
12, 22 email control part
13, 23 user interface
14 execution control part
15 server access control part
15' server function part
16 content holder part
17 GPS function part
18 access control storage
24 browser function part

The invention claimed is:

1. A mobile terminal device which communicates with a counterpart terminal device to implement an information distribution service, comprising:
 a server function part which is configured to provide the counterpart terminal device with information which is selected in advance;
 an email control part which is configured to send an email to the counterpart terminal device and reply to an email from the counterpart terminal device so as to establish connection with the counterpart terminal device; and
 a server access control part which is configured to start the server function part to provide the information to the counterpart terminal device with reference to a management table describing an access method and a disclosure policy,
 wherein the access method includes an address, a port number, and specific information for specifying the information which is provided to the counterpart terminal device.

2. The mobile terminal device according to claim 1, wherein the information is a folder which the counterpart terminal device is allowed to browse according to the disclosure policy of the management table.

3. The mobile terminal device according to claim 1, further comprising a GPS function which is configured to measure positional information serving as the information provided to the counterpart terminal device.

4. The mobile terminal device according to claim 1, wherein the port number is dynamically determined with respect to the information provided to the counterpart terminal device via the server function part.

5. An information distribution service method adapted to a mobile terminal device which communicates with a counterpart terminal device, comprising:
 providing the counterpart terminal device with information which is selected in advance via a server function;
 establishing connection with the counterpart terminal device by sending an email to the counterpart terminal device and replying to an email from the counterpart terminal device; and
 starting the server function to provide the information to the counterpart terminal device with reference to a management table describing an access method and a disclosure policy,
 wherein the access method includes an address, a port number, and specific information for specifying the information which is provided to the counterpart terminal device.

6. The information distribution service method according to claim 5, wherein the information is a folder which the counterpart terminal device is allowed to browse according to the disclosure policy of the management table.

7. The information distribution service method according to claim 5, further comprising a GPS function to measure positional information serving as the information provided to the counterpart terminal device.

8. The information distribution service method according to claim 5, wherein the port number is dynamically determined with respect to the information provided to the counterpart terminal device via the server function.

9. A mobile terminal device which communicates with a counterpart terminal device to implement an information distribution service, comprising:
- a server function part which is configured to provide the counterpart terminal device with information which is selected in advance;
- an email control part which is configured to send an email to the counterpart terminal device and reply to an email from the counterpart terminal device so as to establish connection with the counterpart terminal device; and
- a server access control part which is configured to start the server function part to provide the information to the counterpart terminal device with reference to a management table describing an access method and a disclosure policy,
- wherein the information distribution service utilizes different port numbers depending on disclosed data, thus alleviating a negative influence to terminal functionality due to denial of service.

10. The mobile terminal device according to claim 1, wherein the information distribution service does not require inputting a URL or a port number for accessing the counterpart terminal, thus enhancing accessibility.

11. The mobile terminal device according to claim 1, wherein the management table includes a companion, a counterpart address, a keyword, a folder name and a service name.

12. The information distribution service according to claim 5, wherein the information distribution service utilizes different port numbers depending on disclosed data, thus alleviating a negative influence to terminal functionality due to denial of service.

13. The information distribution service according to claim 5, wherein the information distribution service does not require inputting a URL or a port number for accessing the counterpart terminal, thus enhancing accessibility.

14. The information distribution service according to claim 5, wherein the management table includes a companion, a counterpart address, a keyword, a folder name and a service name.

* * * * *